(12) United States Patent
Imaizumi

(10) Patent No.: US 9,104,422 B2
(45) Date of Patent: Aug. 11, 2015

(54) IMAGE PROCESSING APPARATUS AND METHOD OF IMAGE PROCESSING

(71) Applicant: Yuuki Imaizumi, Kanagawa (JP)

(72) Inventor: Yuuki Imaizumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 303 days.

(21) Appl. No.: 13/795,215

(22) Filed: Mar. 12, 2013

(65) Prior Publication Data

US 2013/0246823 A1      Sep. 19, 2013

(30) Foreign Application Priority Data

Mar. 15, 2012    (JP) ................................ 2012-059313

(51) Int. Cl.
    *G06F 1/32*    (2006.01)
(52) U.S. Cl.
    CPC ........... *G06F 1/3284* (2013.01); *Y02B 60/1267* (2013.01)
(58) Field of Classification Search
    CPC ........... G06F 1/26; G06F 1/32; G06F 1/3287; G06F 3/00; G06F 3/1291
    USPC ....................................................... 713/323
    See application file for complete search history.

(56) References Cited

U.S. PATENT DOCUMENTS

| | | | |
|---|---|---|---|
| 8,095,814 B2 * | 1/2012 | O'Connell et al. ............ | 713/323 |
| 8,374,515 B2 | 2/2013 | Shioyasu et al. | |
| 2009/0077396 A1 * | 3/2009 | Tsai et al. ...................... | 713/310 |
| 2012/0106349 A1 * | 5/2012 | Adjakple et al. ............... | 370/241 |
| 2013/0205152 A1 * | 8/2013 | Lorch et al. .................... | 713/323 |

FOREIGN PATENT DOCUMENTS

| | | |
|---|---|---|
| JP | 2011-051315 | 3/2011 |
| JP | 2011-060028 | 3/2011 |
| JP | 2011-065548 | 3/2011 |

\* cited by examiner

*Primary Examiner* — Vincent Tran
(74) *Attorney, Agent, or Firm* — IPUSA, PLLC

(57) ABSTRACT

An image processing apparatus included in a system including another image processing apparatus, and configured to transition to a first and a second electric power saving mode when functioning as a main apparatus and a slave apparatus, respectively, in the system where the second electric power saving mode is lower than that of the first electric power saving mode, includes a function determining unit which determines whether the image processing apparatus is to function as the main apparatus or the slave apparatus based on a status of the other image processing apparatus which is obtained when the image processing apparatus is performing a job; and an instruction sending unit which sends an instruction to have the other image processing apparatus function as the slave apparatus or the main apparatus when the image processing apparatus is determined to function as the main apparatus or the slave apparatus, respectively.

8 Claims, 11 Drawing Sheets

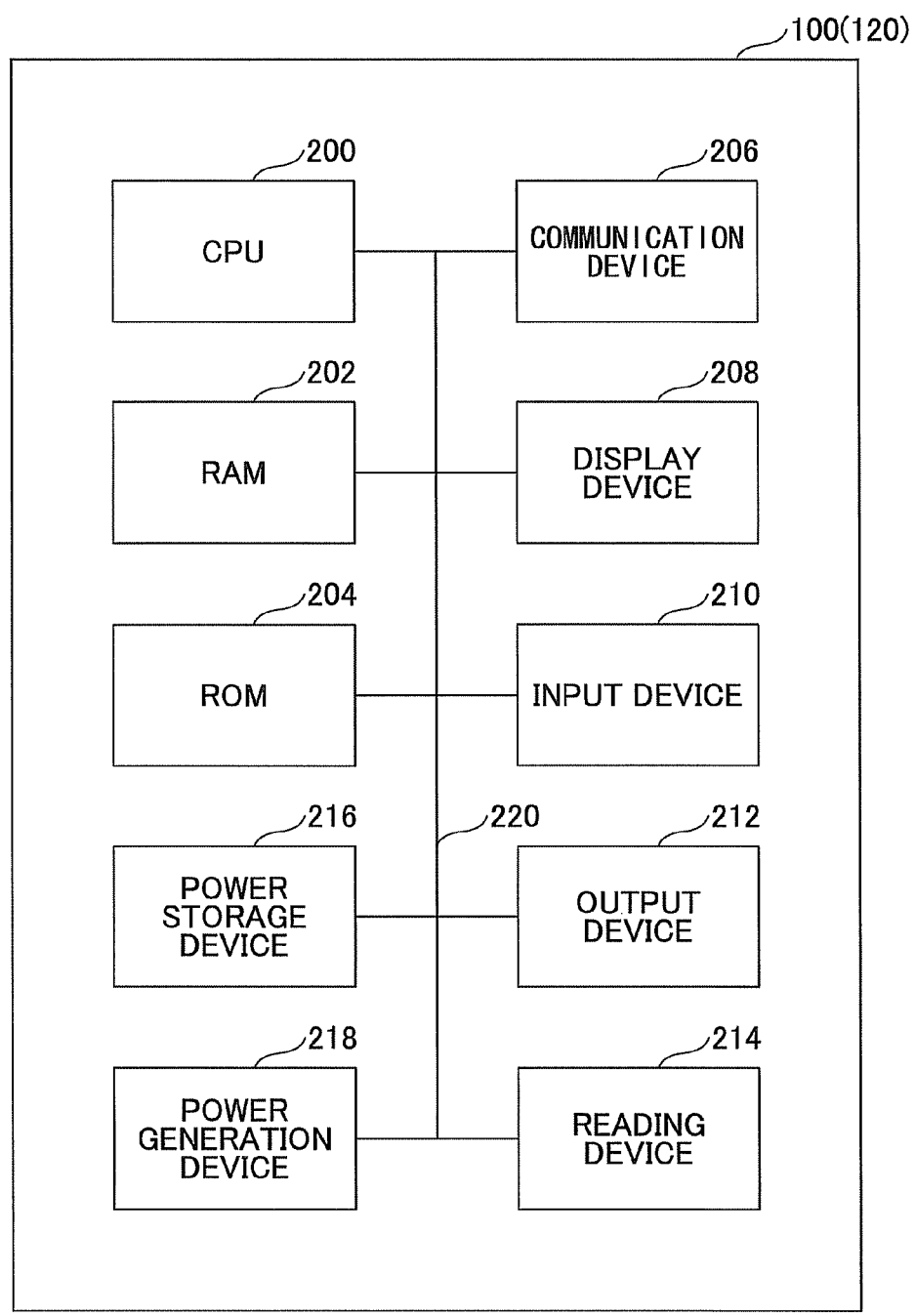

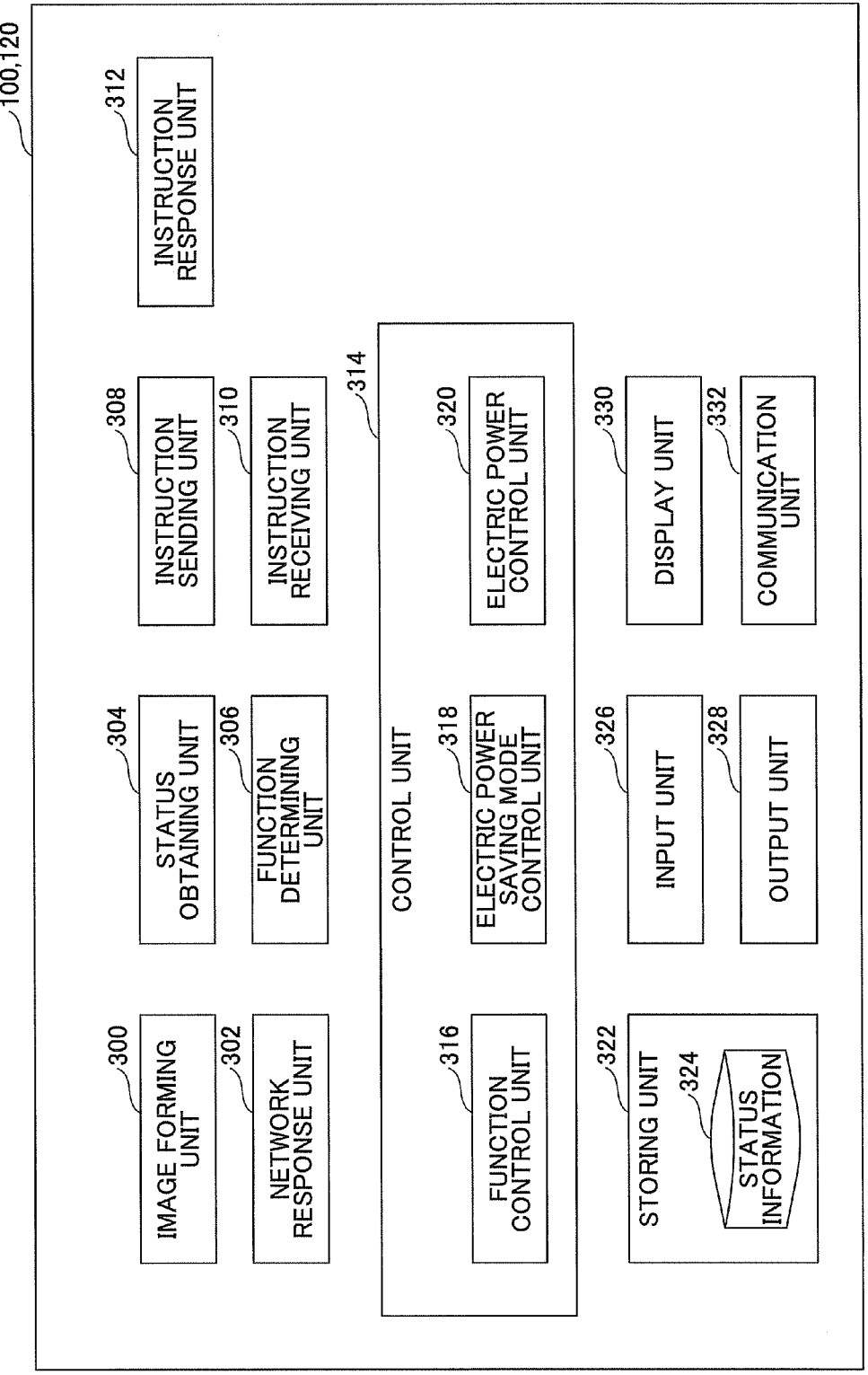

IMAGE PROCESSING APPARATUS AND METHOD OF IMAGE PROCESSING

BACKGROUND OF THE INVENTION

1. Field of the Invention

The present invention relates to an image processing apparatus and a method of image processing.

2. Description of the Related Art

An image forming apparatus represented by a Multifunction Peripheral (MFP) is configured to have plural electric power modes such as an operating mode or an electric power saving mode in order to lower electric power consumption when not actually being operated, and appropriately transition between the modes. Generally, the electric power saving mode includes a mode in which a network response is possible and capable of immediately returning to the operating mode (hereinafter, referred to as an "energy saving standby mode"), and a mode in which almost all of the functions including the network response are terminated to further decrease the electric power consumption (hereinafter, referred to as an "off mode").

Currently, in an office or the like where plural of the image forming apparatuses are placed, all of the apparatuses placed in the office or the like are at the energy saving standby mode at business hours so that the total electric power consumption becomes high.

In order to reduce the total electric power consumption of the image forming apparatuses, there is a method of dividing the apparatuses connected to a network into a main apparatus and a slave apparatus where the main apparatus is set at the energy saving standby mode in which the network response is possible and the slave apparatus is set at the off mode. Meanwhile, the image forming apparatus set as the main apparatus performs the network response instead of the image forming apparatus set as the slave apparatus. Patent Document 1 discloses a method of reducing the electric power consumption of the entirety of the system by transitioning the current slave apparatus to be the main apparatus and the current main apparatus to be the slave apparatus when a returning factor to the operating mode (print request or the like, for example) for the current slave apparatus is detected.

However, according to the conventional method, the main apparatus and the slave apparatus are exchanged by a trigger (the returning factor) caused for the slave apparatus. Thus, when the current slave apparatus (an apparatus B) detects the returning factor while the current main apparatus (the apparatus A) is performing a job for which a long period is necessary to complete, the apparatus B transitions to be the main apparatus and the apparatus A transitions to be the slave apparatus. Then, when the apparatus B functioning as the main apparatus completes the job, the apparatus B becomes the energy saving standby mode while the apparatus A returns to the operating mode. As a result, in the system including the apparatus A and the apparatus B, the apparatus A is at the operating mode while the apparatus B is at the energy saving standby mode. This means excessive electric power is consumed.

Patent Document 2 discloses an image forming system in which the electric power consumption of the entirety of the system is calculated when an electric power status of each of image forming apparatuses is changed to determine an apparatus to function as the main apparatus where a power supply to an image forming unit is terminated when being at the operating mode as the main apparatus and a power supply to the image forming unit and a network control unit is terminated when being at the operating mode as the slave apparatus. However, this determination is performed regardless of the job performing statuses so that there may still be unnecessary electric power consumption.

PATENT DOCUMENT

[Patent Document 1] Japanese Laid-open Patent Publication No. 2011-065548
[Patent Document 2] Japanese Laid-open Patent Publication No. 2011-051315

SUMMARY OF THE INVENTION

The present invention is made in light of the above problems, and provides a technique to reduce electric power consumption of the entirety of a system including image processing apparatuses.

According to an embodiment, there is provided an image processing apparatus included in a system including another image processing apparatus, and configured to transition, when not performing a job, to an electric power saving mode including a first electric power saving mode when functioning as a main apparatus in the system and a second electric power saving mode, whose electric power consumption is lower than that of the first electric power saving mode, when functioning as a slave apparatus. The image processing apparatus includes a status obtaining unit which obtains status information indicating the status of the other image processing apparatus; a function determining unit which determines whether the image processing apparatus is to function as the main apparatus or the slave apparatus based on the status of the other image processing apparatus which is obtained when the image processing apparatus is performing a job; a function control unit which controls the function of the image processing apparatus based on the determination by the function determining unit; and an instruction sending unit which sends an instruction to have the other image processing apparatus function as the slave apparatus when the image processing apparatus is determined to function as the main apparatus, and to have the other image processing apparatus function as the main apparatus when the image processing apparatus is determined to function as the slave apparatus to the other image processing apparatus.

According to another embodiment, there is provided a method of image processing performed in an image processing apparatus included in a system including another image processing apparatus, and configured to transition, when not performing a job, to an electric power saving mode including a first electric power saving mode when functioning as a main apparatus in the system and a second electric power saving mode, whose electric power consumption is lower than that of the first electric power saving mode, when functioning as a slave apparatus. The method includes obtaining status information indicating the status of the other image processing apparatus; determining whether the image processing apparatus is to function as the main apparatus or the slave apparatus based on the status of the other image processing apparatus which is obtained when the image processing apparatus is performing a job; controlling the function of the image processing apparatus based on the determination; and sending an instruction to have the other image processing apparatus function as the slave apparatus when the image processing apparatus is determined to function as the main apparatus, and to have the other image processing apparatus function as the main apparatus when the image processing apparatus is determined to function as the slave apparatus to the other image processing apparatus.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 2 is a block diagram showing an example of a hardware structure of the image forming apparatus of the embodiment;

FIG. 3 is a block diagram showing an example of a functional structure of the image forming apparatus of the embodiment;

DETAILED DESCRIPTION OF THE PREFERRED EMBODIMENTS

Figure 1:
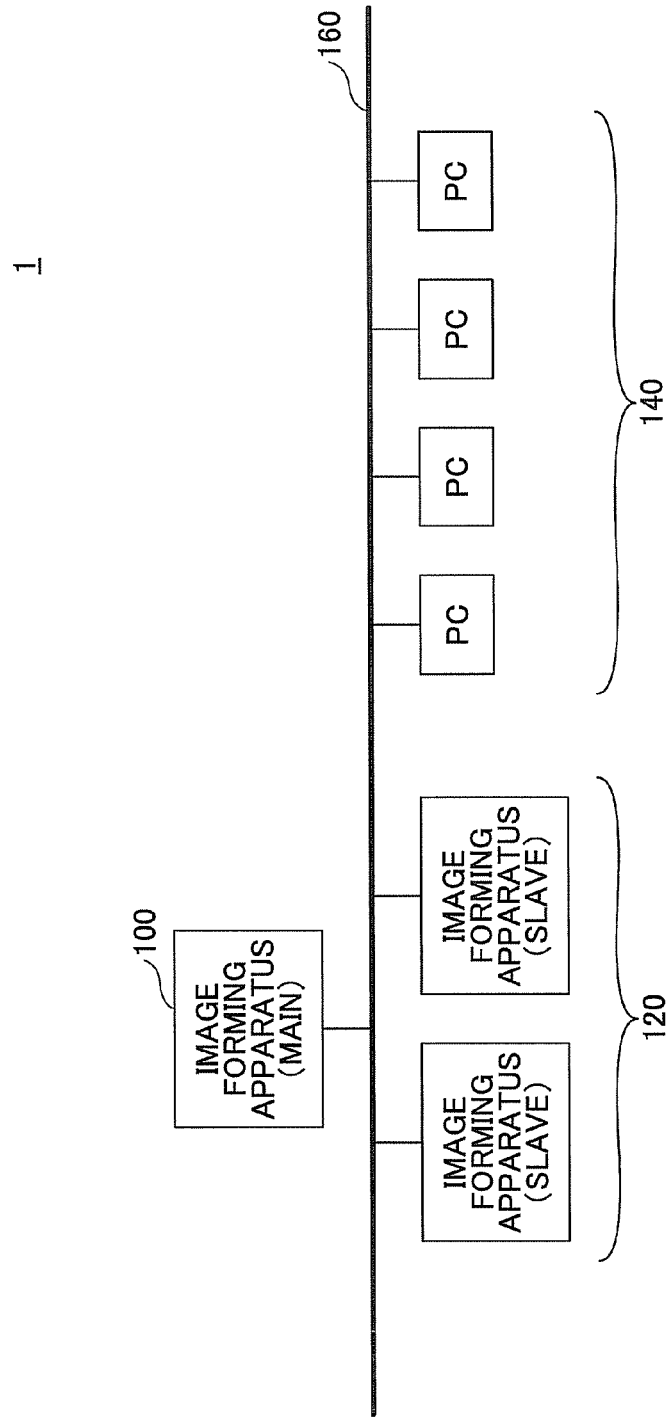
FIG. 1 is a schematic view showing an example of a system structure including image forming apparatuses of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First, a system 1 is schematically explained with reference to FIG. 1. The system 1 includes an image forming apparatus 100, plural image forming apparatuses 120, plural PCs 140 and a network 160. The image forming apparatus (an example of an image processing apparatus) which functions as a main apparatus is referred to as the "image forming apparatus 100" while the image forming apparatus (an example of an image processing apparatus) which functions as a slave apparatus is referred to as the "image forming apparatus 120" in this embodiment. Here, the system 1 includes a single main apparatus and plural slave apparatuses.

The image forming apparatus 100 and each of the image forming apparatuses 120 basically have the same structure and functions except whether to function as the main apparatus or the slave apparatus. Thus, in the following, the image forming apparatus 100 is explained.

The image forming apparatus 100 (120) is a printer apparatus such as a Multifunction Peripheral (MFP) and is capable of performing a printing operation upon receiving a print request from the PC 140, which is a user terminal, via the network 160. The image forming apparatus 100 (120) is configured to transition to an electric power saving mode by terminating a power supply to a specific device when a predetermined condition is satisfied. The predetermined condition is satisfied means that a process request is not received for a predetermined period, at a previously determined time by an administrator or the like, when a user instructs to transition to the electric power saving mode or the like, but is not limited so. The specific device to which the power supply is terminated may be, for example, a display panel of a display, a reading unit of a scanner or the like, but is not limited so.

Here, the electric power saving mode includes plural modes in accordance with a degree of decreasing the electric power consumption. For example, the electric power saving mode includes a mode in which a network response is possible and capable of immediately being returned back to an operating mode (hereinafter, referred to as an "energy saving standby mode") and a mode in which almost all of the functions including the network response are terminated to further lower the electric power consumption (hereinafter, referred to as an "off mode"). In this embodiment, when the image forming apparatus transitions to the electric power saving mode, which of the electric power saving modes is selected is determined based on whether the image forming apparatus is functioning as the main apparatus or the slave apparatus.

When the image forming apparatus is functioning as the main apparatus, the image forming apparatus transitions to the energy saving standby mode of the electric power saving mode. It means that the image forming apparatus 100 functioning as the main apparatus is capable of performing the network response even at the electric power saving mode, and is capable of immediately returning back to the operating mode. On the other hand, when the image forming apparatus 120 is functioning as the slave apparatus, almost all of the functions including the network response to the PC 140 are terminated. Thus, when the PC 140 sends a process request to the image forming apparatus 120 functioning as the slave apparatus at the off mode, the image forming apparatus 100 functioning as the main apparatus responds in place of the image forming apparatus 120. Then, the image forming apparatus 100 functioning as the main apparatus cancels the off mode of the image forming apparatus 120 in accordance with the necessity to have the image forming apparatus 120 perform the process in response to the process request.

The image forming apparatus of the embodiment 100 (120) obtains status information indicating statuses of other image forming apparatuses while performing a printing job (before performing the job, while performing the job or after performing the job) and determines whether to function as the main apparatus or the slave apparatus based on the obtained status information. The status information of the image forming apparatus includes the above described electric power saving mode information, printing job process status information or charging status information. The status information is explained later in detail. Then, when the image forming apparatus determines to function as the main apparatus based on the status information of the other image forming apparatuses, the image forming apparatus instructs the other image forming apparatuses to function as the slave apparatus. Further, when the image forming apparatus determines to function as the slave apparatus, the image forming apparatus instructs one of the other image forming apparatuses to function as the main apparatus.

As described above, the image forming apparatus of the embodiment is capable of reducing the electric power consumption of the entirety of the system by transitioning between the main apparatus and the slave apparatus while performing the printing job based on the statuses of the other image forming apparatuses.

(Hardware Structure)

FIG. 2 is a block diagram showing an example of a hardware structure of the image forming apparatus 100 (or 120) of the embodiment. The image forming apparatus 100 shown in FIG. 2 includes a CPU 200, a RAM 202, a ROM 204, a communication device 206, a display device 208, an input device 210, an output device 212, a reading device 214, a power storage device 216, a power generation device 218 and a bus 220.

The CPU 200 executes a program which controls operation of the image forming apparatus 100. The RAM 202 provides a work area of the CPU 200. The ROM 204 stores a program executed by the CPU 200, data used by the program and the like. The operating status of the image forming apparatus and the obtained status information of the other image forming apparatuses are also stored in the ROM 204.

The communication device 206 includes a network interface for connecting to a network by wired LAN, wireless LAN or Personal Area Network (PAN). The display device 208 is a liquid crystal display, for example, which displays a menu or options of functions performed on the image forming apparatus 100. The input device 210 is a touch panel or a keyboard, for example, which accepts an input from the user. The output device 212 is a printer or a plotter, for example, which outputs an image formed by the program of the image forming apparatus 100 by printing on a paper or the like. The reading device 214 is a scanner, for example, which reads an image on a paper or the like as image data.

The power storage device 216 is a lithium-ion battery, for example, which enables the image forming apparatus 100 to be operated without being supplied by external electric power. The power storage device 216 is charged when the image forming apparatus 100 is at the operating mode and discharged when the image forming apparatus 100 is at the electric power saving mode, for example. The power generation device 218 is a photovoltaic power generation device, for example, which is capable of generating electric power for the image forming apparatus 100 to be operated. When the power generation device 218 is capable of generating the electric power, the power generation device 218 supplies the entirety or a part of the electric power necessary for the operation of the image forming apparatus 100, or supplies the electric power for charging the power storage device 216. The bus 220 electrically connects the above devices.

With the above structure, the image forming apparatus of the embodiment is capable of being transitioned between the main apparatus and the slave apparatus based on the status of the other image forming apparatuses to reduce the electric power consumption of the entirety of the system.

(Functional Block)

FIG. 3 is a block diagram showing a functional structure of the image forming apparatus 100 (or 120) of the embodiment. The image forming apparatus 100 shown in FIG. 3 includes an image forming unit 300, a network response unit 302, a status obtaining unit 304, a function determining unit 306, an instruction sending unit 308, an instruction receiving unit 310, an instruction response unit 312, a control unit 314, a storing unit 322, an input unit 326, an output unit 328, a display unit 330 and a communication unit 332.

The control unit 314 includes a function control unit 316, an electric power saving mode control unit 318 and an electric power control unit 320 and controls the operation of the image forming apparatus.

The image forming unit 300 performs an entirety of an image forming operation including a printing operation, a scanning operation, a facsimile operation, and a noise reduction operation, for example, in accordance with the instruction by the user.

The network response unit 302 responds to a process request received from the PCs 140 of the users or the other image forming apparatuses via the communication unit 332. The operations of the network response unit 302 and the communication unit 332 may be terminated when the image forming apparatus 120 is at the off mode. At this time, the network response unit 302 of the image forming apparatus 100 functioning as the main apparatus responds in place of the image forming apparatus 120 functioning as the slave apparatus at the off mode. Here, the network response unit 302 may be configured to respond to a predetermined request and a request of canceling the electric power saving mode, for example, from the image forming apparatus 100 functioning as the main apparatus even when the image forming apparatus 120 is at the off mode. For this reason, Wake-on-LAN (WOL) is used, for example.

The status obtaining unit 304 obtains status information which indicates statuses of other image forming apparatuses via the communication unit 332. The status information includes the electric power saving mode information, the printing job process status information or the charging status information of the other image forming apparatuses.

The electric power saving mode information includes information indicating the electric power saving mode, either of the operating mode (non-electric power saving mode), the energy saving standby mode or the off mode. The printing job process status information includes information indicating a predicted time when the printing job which is being performed is to be completed in addition to information indicating whether the printing job is being performed. The charging status information includes information indicating a current charging status of the power storage device 216 (a percentage of a remaining capacity of a battery, for example). Further, in addition to above, inherent information (such as a model number, a model name, and a MAC address, for example), various setting information (such as a standby period to become the electric power saving mode, for example) or the like of the other image forming apparatus may be obtained.

The status information is obtained when determining whether the image forming apparatus is to function as the main apparatus or the slave apparatus by the function determining unit 306, which will be explained later.

The function determining unit 306 determines whether the image forming apparatus functions as the main apparatus or the slave apparatus based on the status information of the other image forming apparatuses obtained by the status obtaining unit 304. The function control unit 316, which will be explained later, controls the operation of the image forming apparatus based on the determination by the function determining unit 306. The determination is performed in accordance with the following conditions.

(1) When Power is Switched on

When there is already another image forming apparatus which is functioning as the main apparatus in the system 1, the function determining unit 306 determines that the image forming apparatus is to function as the slave apparatus. When there is not the other image forming apparatus which is functioning as the main apparatus in the system 1, the function determining unit 306 determines that the image forming apparatus is to function as the main apparatus.

(2) When Functioning as Main Apparatus

When the printing job is being performed, or the printing job is completed, the function determining unit 306 determines that the image forming apparatus is to function as the slave apparatus when the mode of the other image forming apparatus is at the operating mode (non-electric power saving mode). The determination may be performed when the printing job is completed or while the printing job is being performed. When the determination is performed while the printing job is being performed, the function determining unit 306 may previously determine a timing when the other image forming apparatus transitions to the electric power saving mode based on the status information obtained from the other image forming apparatus and perform the determination by comparing a timing when the printing job of the image forming apparatus is to be completed. It means that, when the timing when the printing job of the image forming apparatus is completed is prior to the timing when the other image forming apparatus transitions to the electric power saving mode, the function determining unit 306 may determine that the image forming apparatus is to function as the slave apparatus. Here, the timing when the other image forming apparatus transitions to the electric power saving mode may be obtained, for example, by adding a period necessary for completing the job currently being performed by the other image forming apparatus and a predetermined stand-by period (when fixed as a set value) necessary for the other image forming apparatus to transition to the electric power saving mode after becoming an idle state, to the current time. Information relating to the job currently being performed by the other image forming apparatus may be included in the status information obtained from the other image forming apparatus, for example. Further, the predetermined stand-by period necessary for the other image forming apparatus to transition to the electric power saving mode after becoming the idle state may also be included in the status information obtained from the other image forming apparatus.

(3) When Functioning as Slave Apparatus (when the Apparatus Functioning as the Main Apparatus is at the Electric Power Saving Mode)

When the image forming apparatus functioning as the main apparatus is at the electric power saving mode before performing the printing job, the function determining unit 306 determines that the image forming apparatus is to function as the main apparatus.

(4) When Functioning as Slave Apparatus (when the Other Apparatus Functioning as the Main Apparatus is at the Operating Mode)

The function determining unit 306 determines that the image forming apparatus is to function as the main apparatus when being instructed by the other image forming apparatus to be the main apparatus while performing the printing job or when the printing job is completed.

(5) When Receiving an Instruction from the Other Image Forming Apparatus

When an instruction to function as the main apparatus or the slave apparatus is received by the instruction receiving unit 310, which will be explained later, from the other image forming apparatus, the function determining unit 306 determines the function of the image forming apparatus in accordance with the instruction.

The instruction sending unit 308 sends an instruction to function as the main apparatus or the slave apparatus for the other image forming apparatus to the other image forming apparatus via the communication unit 332 based on the determination by the function determining unit 306. It means that when the image forming apparatus is determined to function as the main apparatus, the instruction sending unit 308 instructs the other image forming apparatus to function as the slave apparatus. On the other hand, when the image forming apparatus is determined to function as the slave apparatus, the instruction sending unit 308 instructs the other image forming apparatus to function as the main apparatus. Here, when there are plural candidate other image forming apparatuses to function as the main apparatus, one of the other image forming apparatuses is selected based on the following conditions.

(1) The other image forming apparatus for which the timing to transition to the electric power saving mode is the latest (2) The other image forming apparatus for which the charging state is the worst, in other words, most discharged and necessary to be charged (3) The other image forming apparatus which is not capable of being at the electric power saving mode corresponding to the off mode.

(4) The other image forming apparatus capable of minimizing the electric power consumption of the entirety of the system when functioning as the main apparatus while all of the image forming apparatuses included in the system 1 become the electric power saving mode.

The above conditions may be arbitrarily combined in a priority order based on the numbers and the kinds of the image forming apparatuses included in the system 1.

The instruction receiving unit 310 receives an instruction for the image forming apparatus to function as the main apparatus or the slave apparatus sent from the instruction sending unit 308 of the other image forming apparatus.

The instruction response unit 312 sends a response to the instruction sent from the instruction sending unit 308 of the other image forming apparatus to the other image forming apparatus.

The function control unit 316 controls the function of the image forming unit (function as the main apparatus or the slave apparatus) based on the determination by the function determining unit 306. Here, when the image forming apparatus is determined to function as the slave apparatus, an instruction for the other image forming apparatus to function as the main apparatus is sent to the other image forming apparatus. Then, the image forming apparatus is changed to function as the slave apparatus when a response to the instruction is received from the other image forming apparatus. On the other hand, when the image forming apparatus is determined to function as the main apparatus, the image forming apparatus is immediately changed to function as the main apparatus.

The electric power saving mode control unit 318 controls the electric power saving mode of the image forming apparatus. First, the electric power saving mode control unit 318 transitions the mode of the image forming apparatus to the electric power saving mode by the lapse of the predetermined stand-by period, at a predetermined time zone, at the instruction by the user or the like. Then, the electric power saving mode control unit 318 returns the mode of the image forming apparatus to the operating mode by the process request, at the instruction by the user or the like. As described above, the image forming apparatus transitions to the energy saving standby mode when the image forming apparatus is functioning as the main apparatus, and transitions to the off mode when the image forming apparatus is functioning as the slave apparatus. Although the functions of the network response unit 302 and the communication unit 332 are terminated at the off mode, the image forming apparatus may be configured to be capable of accepting a predetermined request such as a request to return back to the operating mode from the main apparatus.

The electric power control unit 320 controls the electric power supplied to the image forming apparatus. The image forming apparatus may be operated by the electric power supplied from the power storage device 216 or the power generation device 218 in addition to the electric power supplied from outside. When the image forming apparatus is at the operating mode, the electric power control unit 320 charges the power storage device 216. Further, when the image forming apparatus is at the electric power saving mode, the electric power control unit 320 supplies the electric power using the power storage device 216 as much as possible. Further, both in charging and being operated, when it is possible to supply the electric power from the power generation device 218, the electric power supplied from the power generation device 218 is predominately used.

The storing unit 322 stores information used in the image forming apparatus in addition to status information 324 of the image forming apparatus. The status information 324 includes a model name, a model number, MAC address, the current function (main apparatus or slave apparatus), electric power saving mode information (operating mode, energy saving standby mode, off mode), job performance status information (while performing a job, while not performing a job), charging status information (percentage of the charged capacity), various setting information (standby period to be the electric power saving mode or the like) of the image forming apparatus, but not limited so. The status information 324 includes information accessible by the status obtaining unit 304 of the other image forming apparatus.

The input unit 326 is used to input an instruction by the user via the input device 210.

The output unit 328 is used for outputting an image processed by the image forming unit 300 in a form of a paper, a facsimile or data.

The display unit 330 is used for displaying information related to the image forming apparatus for the user.

The communication unit 332 communicates with the other image forming apparatus or the PC 140 by plural communication systems defined by Ethernet (registered trademark), WiFi (registered trademark) or Bluetooth (registered trademark), for example. When the image forming apparatus is at the off mode, the operation of the communication unit 332 may be terminated with the network response unit 302. Here, the communication unit 332 may be configured to receive a predetermined process request, and the request of canceling the electric power saving mode, for example, from the other image forming apparatus 100 which is functioning as the main apparatus even when the image forming apparatus is at the off mode.

As such, the image forming apparatus of the embodiment determines whether to function as the main apparatus or the slave apparatus in accordance with the status of the other image forming apparatuses. Thus, when a job of the image forming apparatus is completed and the image forming apparatus transitions to the electric power saving mode, if the other image forming apparatus is at the operating mode, the image forming apparatus can be transitioned to the off mode (off mode). Further, when all of the other image forming apparatuses are at the off mode, it is possible for the image forming apparatus to transition to the energy saving standby mode. Therefore, states can be prevented in which the main apparatus becomes the energy saving standby mode while the slave apparatus is at the operating mode, or the plural apparatuses are at the energy saving standby mode, so that the electric power consumption of the entirety of the system can be reduced.

Further, by changing the main apparatus and the slave apparatus based on the charging state, the amount of using the external electric power is at a low electric power consumption status.

(Process Flow)

The process of the image forming apparatus 100 (or 120) of the embodiment is explained with reference to FIGS. 4A and 4B.

Figure 4A:
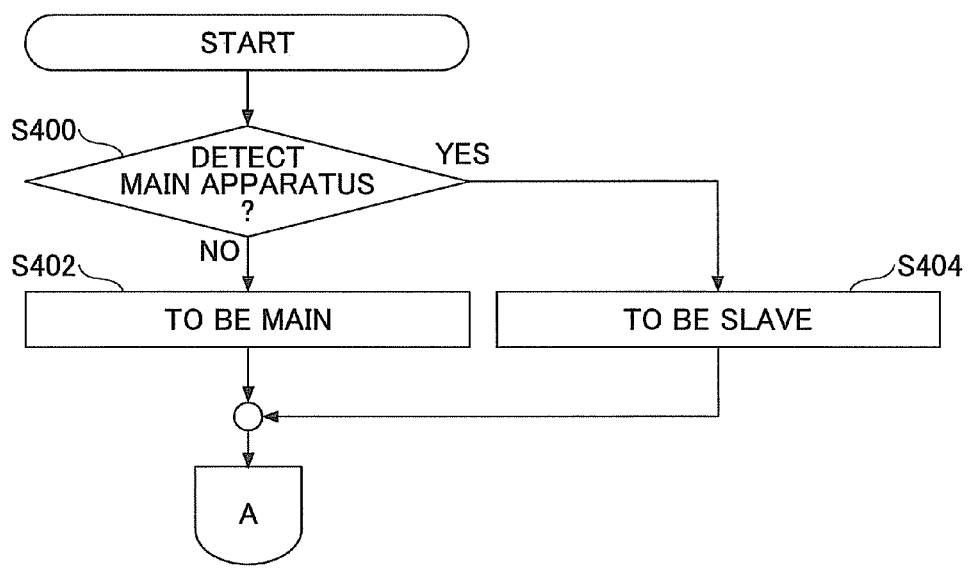
FIG. 4A is a flowchart showing an operation of the image forming apparatus of the embodiment.

In step S400 of FIG. 4A, when the power of the image forming apparatus is switched on, the status obtaining unit 304 of the image forming apparatus detects whether there exists another image forming apparatus functioning as the main apparatus on the system 1 via the communication unit 332. This detection may be performed via the network 160 which is connected to the other image forming apparatuses or the PCs 140. Alternatively, whether there is the main apparatus can be detected by directly communicating with the other image forming apparatuses via a near field wireless communication system such as Bluetooth (registered trademark). When the other image forming apparatus functioning as the main apparatus is not detected (NO in step S400), the process proceeds to step S402. When the other image forming apparatus functioning as the main apparatus is detected (YES in step S400), the process proceeds to step S404.

In step S402, the function determining unit 306 determines that the image forming apparatus is to function as the main apparatus, and the function control unit 316 controls the image forming apparatus to function as the main apparatus. The function of the image forming apparatus is stored in the storing unit 322 as the status information 324. Then, the process proceeds to step S410.

In step S404, the function determining unit 306 determines that the image forming apparatus is to function as the slave apparatus, and the function control unit 316 controls the image forming apparatus to function as the slave apparatus. The function of the image forming apparatus is stored in the storing unit 322 as the status information 324. Then, the process proceeds to step S410.

Figure 4B:
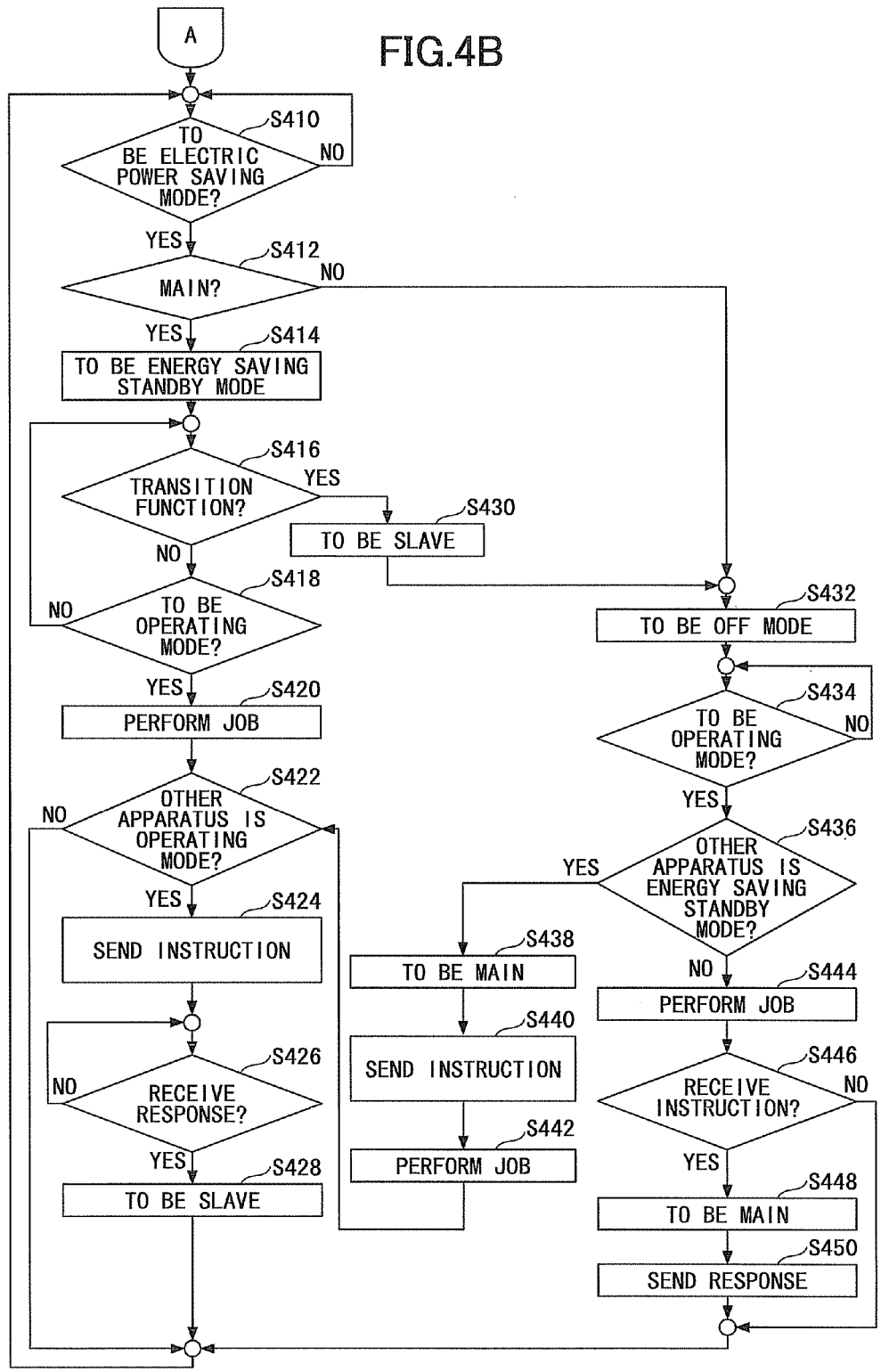
FIG. 4B is a flowchart showing an operation of the image forming apparatus of the embodiment.

In step S410 in FIG. 4B, the image forming apparatus transitions to the operating mode and performs a normal operation. Then, when the image forming apparatus is to be transitioned to the electric power saving mode by the electric power saving mode control unit 318, the process proceeds to step S412.

In step S412, whether the image forming apparatus is functioning as the main apparatus or the slave apparatus is determined. When the image forming apparatus is functioning as the main apparatus (YES in step S412), the process proceeds to step S414. When the image forming apparatus is functioning as the slave apparatus (NO in step S412), the process proceeds to step S432.

In step S414, the electric power saving mode control unit 318 transitions the image forming apparatus to the energy saving standby mode. At the energy saving standby mode, the power supply to the display device 208 or the like except the communication device 206 is reduced or terminated so that the electric power consumption becomes lower compared with the operating mode.

In step S416, when the instruction receiving unit 310 receives the instruction to transition to the slave apparatus from the other image forming apparatus (YES in step S416), the process proceeds to step S430. Otherwise (NO in step S416), the process proceeds to step S418.

In step S418, when a process request is sent from the PC 140 of the user or the like, and the electric power saving mode control unit 318 transitions the mode of the image forming apparatus to the operating mode (YES in step S418), the process proceeds to step S420. Otherwise (NO in step S418), the process moves back to step S416.

In step S420, the job indicated by the process request is performed. Here, the status obtaining unit 304 may obtain the status information of the other image forming apparatuses at an arbitrary timing before performing the job, while performing the job or after performing the job.

In step S422, when the job is completed, when the mode of the other image forming apparatus functioning as the slave apparatus is the operating mode (YES in step S422), the process proceeds to step S424. When the mode of the other image forming apparatus functioning as the slave apparatus is the off mode (NO in step S422), the process moves back to step S410.

In step S424, the function determining unit 306 determines that the image forming apparatus is to function as the slave apparatus. Then, the instruction sending unit 308 sends an instruction for the other image forming apparatus to function as the main apparatus to the other image forming apparatus. Here, when there are plural of the other image forming apparatuses, one of the other image forming apparatuses is selected by the above described conditions and the instruction is sent to the selected other image forming apparatus.

In step S426, when a response to the above instruction is received from the other image forming apparatus (YES in step S426), the process proceeds to step S428. Otherwise (NO in step S426), a predetermined time is waited for the response. When the response cannot be received, the instruction may be resent a predetermined number of times. When the response to the instruction cannot be obtained for a predetermined period, or after sending the instruction for the predetermined number of times, the process may return back to step S410 without proceeding to step S428.

When the response to the instruction is received from the other image forming apparatus to which the instruction is sent (YES in step S426), in step S428, the function control unit 316 controls the image forming apparatus to function as the slave apparatus. Then, the process moves back to step S410.

In step S430, the function determining unit 306 determines that the image forming apparatus is to function as the slave apparatus and the function control unit 316 controls the image forming apparatus to function as the slave apparatus. Thereafter, the image forming apparatus performs a normal operation in the operating mode.

In step S432, when a predetermined condition is met, the electric power saving mode control unit 318 transitions the image forming apparatus to the off mode. At the off mode, the power supply to more devices including the communication device 206 is reduced or terminated compared with a case at the energy saving standby mode and the electric power consumption becomes lower compared with a case at the energy saving standby mode.

In step S434, when a process request is sent from another image forming apparatus functioning as the main apparatus and the electric power saving mode control unit 318 transitions the image forming apparatus to the operating mode (YES in step S434), the process proceeds to step S436.

In step S436, the status obtaining unit 304 obtains the status information of the other image forming apparatus functioning as the main apparatus. Then, when the other image forming apparatus functioning as the main apparatus is at the energy saving standby mode (YES in step S436), the process proceeds to step S438. When the other image forming apparatus functioning as the main apparatus is at the operating mode (NO in step S436), the process proceeds to step S444.

In step S438, the function determining unit 306 determines that the image forming apparatus is to function as the main apparatus. This is done in order to have the other image forming apparatus previously functioning as the main apparatus at the energy saving standby mode transition to function as the slave apparatus at the off mode.

In step S440, an instruction for the other image forming apparatus to function as the slave apparatus is sent to the other image forming apparatus.

In step S442, the job indicated by the process request received in step S434 is performed and the process proceeds to step S422.

In step S444, the job indicated by the process request received in step S434 is performed. Here, the status obtaining unit 304 obtains the status information of the other image forming apparatus while performing the job.

In step S446, when the instruction receiving unit 310 receives an instruction to function as the main apparatus before completing performing the job (YES in step S446), the process proceeds to step S448. When the instruction receiving unit 310 does not receive the instruction to function as the main apparatus (NO in step S446), the process moves back to step S410.

In step S448, the function determining unit 306 determines that the image forming apparatus is to function as the main apparatus, and the function control unit 316 controls the image forming apparatus to function as the main apparatus.

In step S450, the instruction response unit 312 sends a response to the instruction received in step S446 to the other image forming apparatus. Then, the process moves back to step S410.

With the above processes, in the system 1 including the image forming apparatuses of the embodiment, the opportunity for the image forming apparatuses to become in off mode can be increased and the electric power consumption of the entirety of the system can be reduced.

Figure 5:
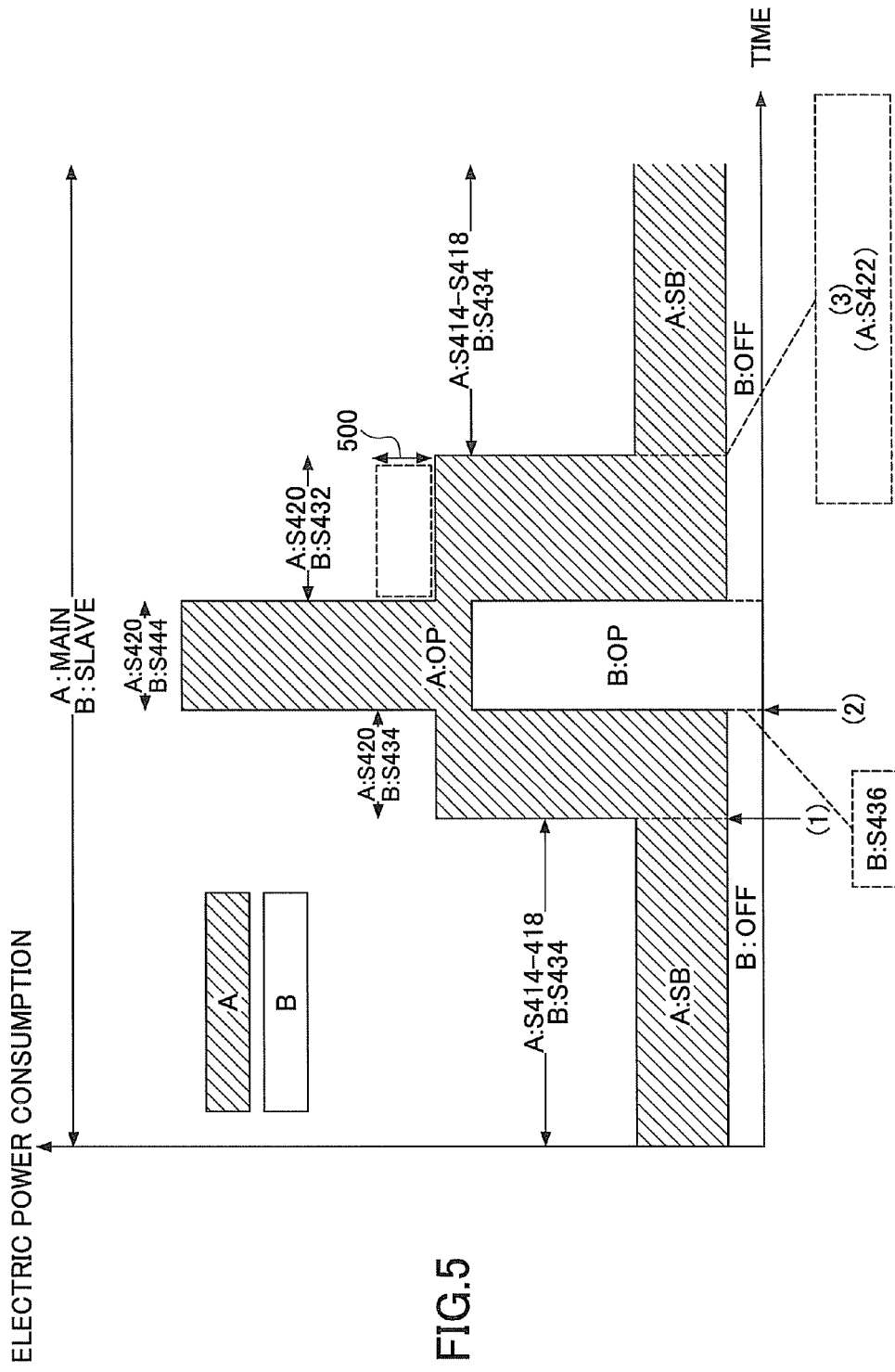
FIG. 5 is a view showing an example of switching functions of two image forming apparatuses of the embodiment.

The above mechanism is further explained in detail with reference to FIG. 5. FIG. 5 is a view showing an example of switching functions of two image forming apparatuses A and B of the embodiment. In FIG. 5, axis of abscissa expresses time, and axis of ordinate expresses the electric power consumption.

At the initial state, the image forming apparatus A is functioning as the main apparatus while the image forming apparatus B is functioning as the slave apparatus where both of the image forming apparatuses A and B are at electric power saving modes. At this time, as the image forming apparatus A is functioning as the main apparatus, the image forming apparatus A is at the energy saving standby mode SB and as the image forming apparatus B is functioning as the slave apparatus, the image forming apparatus B is at the off mode OFF.

At a timing (1), the electric power saving mode control unit 318 of the image forming apparatus A detects a returning factor (for example, a print request) to become the operating mode OP, and transitions the operating status of the image forming apparatus A to the operating mode OP. Then, the image forming apparatus A performs the job, which is the returning factor. The electric power consumption of the image forming apparatus A is increased while performing the job. Thereafter, at a timing (2), similarly, the image forming apparatus B detects a returning factor to the operating mode OP and the job is performed. At this time, the status obtaining unit 304 of the image forming apparatus B obtains the status information of the image forming apparatus A and recognizes that the image forming apparatus A which is functioning as the main apparatus is at the operating mode OP. Thus, the function determining unit 306 of the image forming apparatus B does not determine that the image forming apparatus B is to function as the main apparatus (step S436). Then, when the job is completed, the image forming apparatus B continues to function as the slave apparatus, unless an instruction to function as the main apparatus is sent from the image forming apparatus A, and returns to the off mode OFF. Thereafter, at a timing (3), when the image forming apparatus A completes performing the job, the image forming apparatus A transitions to the energy saving standby mode SB.

As a result, the electric power corresponding to an amount 500 can be reduced compared with a case when the image forming apparatus B is changed to function as the main apparatus at the timing (2).

Figure 6:
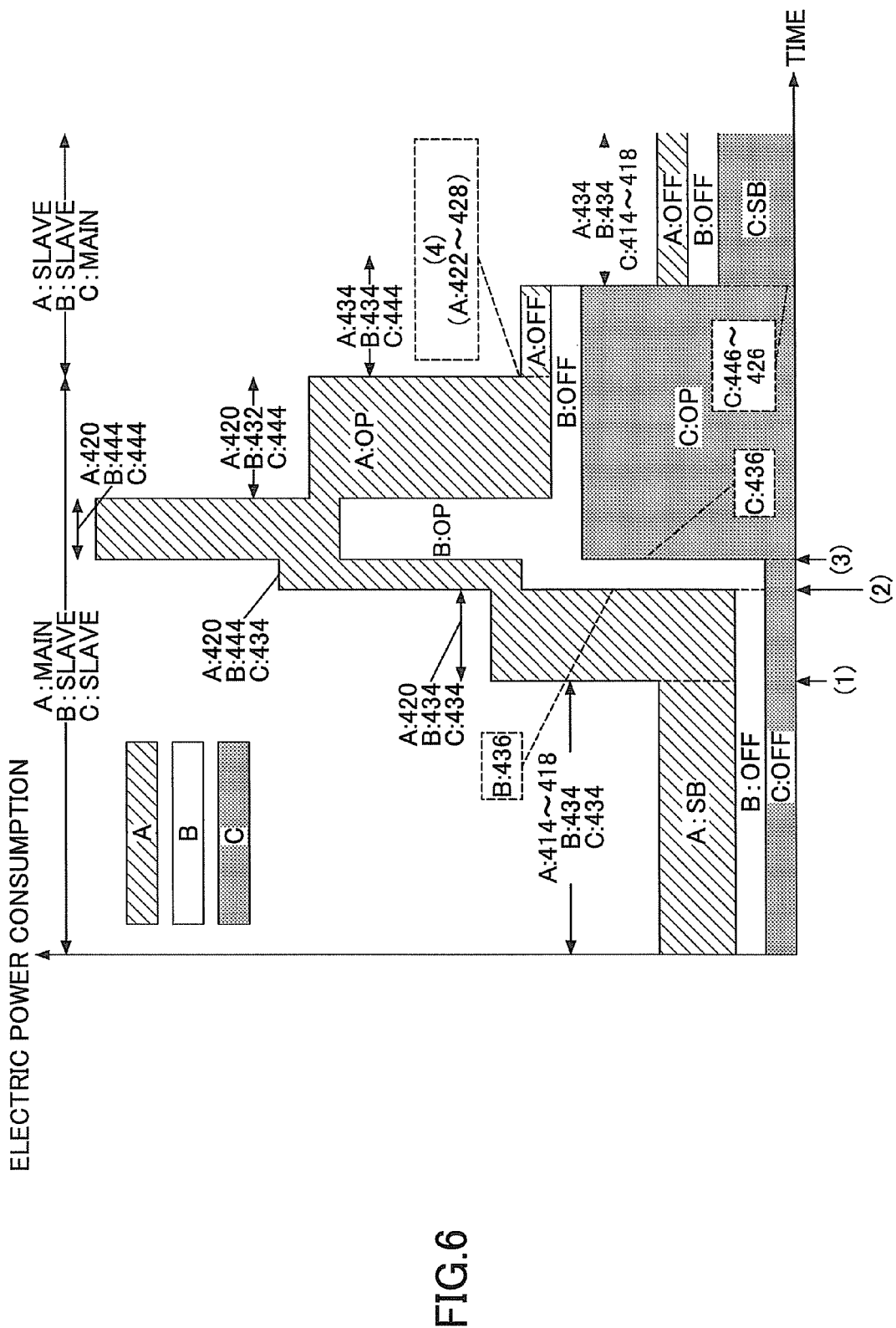
FIG. 6 is a view showing an example of switching functions of three image forming apparatuses of the embodiment.
Figure 7:
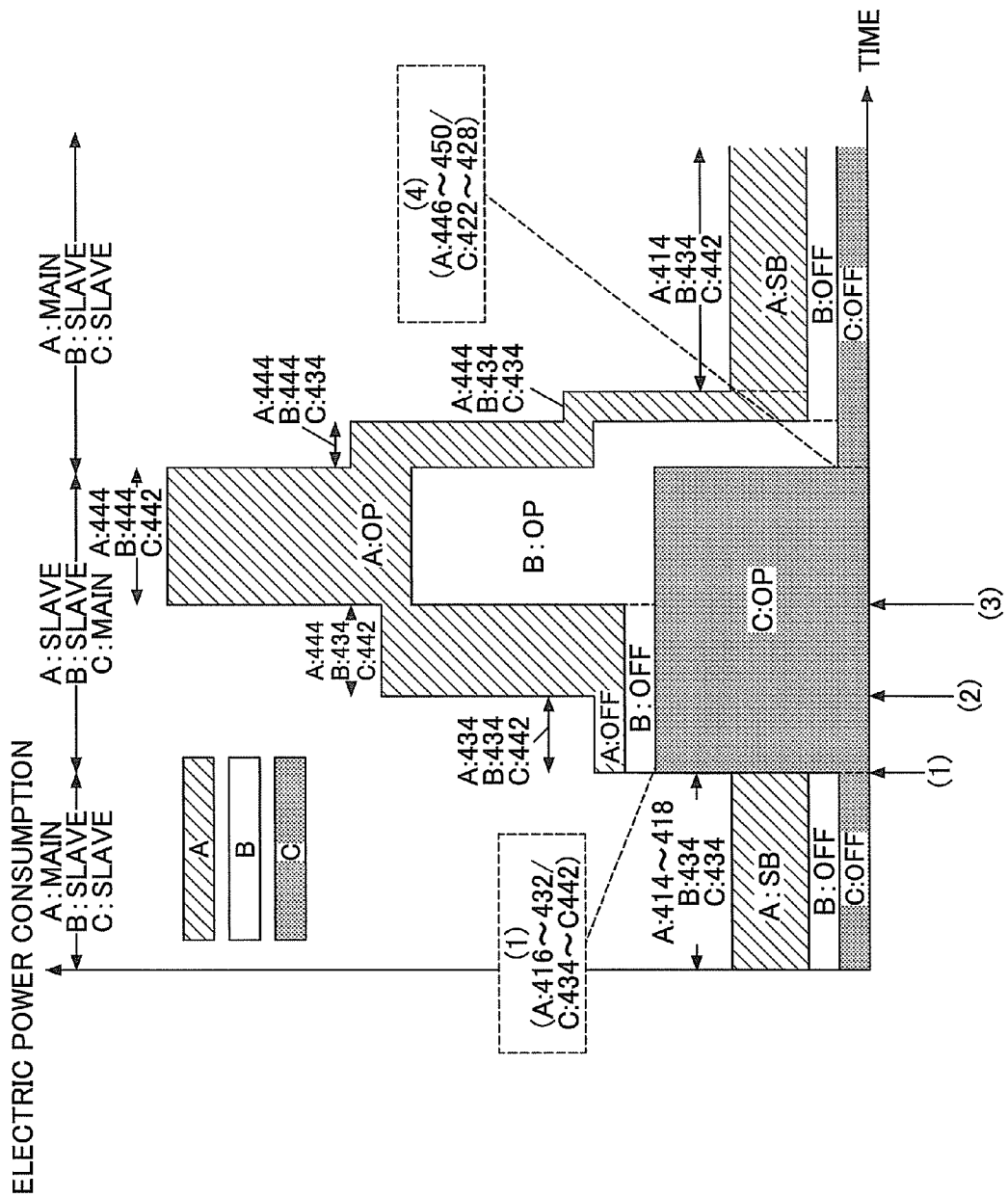
FIG. 7 is a view showing another example of switching functions of the three image forming apparatuses of the embodiment.

Then, with reference to FIGS. 6 and 7, the electric power consumption of a case in which image forming apparatuses A to C are included in the system is explained. In FIGS. 6 and 7, similar to FIG. 5, axis of abscissa expresses time, and axis of ordinate expresses the electric power consumption.

For a case shown in FIG. 6, initially, the image forming apparatus A functions as the main apparatus while the image forming apparatuses B and C function as the slave apparatuses, respectively. Here, all of the image forming apparatuses are at the electric power saving modes. At this time, as the image forming apparatus A is functioning as the main apparatus, the image forming apparatus A is at the energy saving standby mode SB and as the image forming apparatuses B and C are functioning as the slave apparatuses, the image forming apparatuses B and C are at the off mode OFF, respectively.

At a time (1), the image forming apparatus A transitions to the operating mode, and the job is performed. Subsequently, at a time (2), the image forming apparatus B transitions to the operating mode, and the job is performed. Further, at a time (3), the image forming apparatus C transitions to the operating mode, and the job is performed. Thereafter, the image forming apparatus B completes performing the job and as the other image forming apparatuses A and C are performing the jobs, respectively, the function of the image forming apparatus B is not changed and returns to the off mode OFF. Subsequently, at a time (4), the image forming apparatus A completes performing the job. At this time, as the image forming apparatus C is at the operating mode, an instruction to function as the main apparatus is sent to the image forming apparatus C and the image forming apparatus A becomes the off mode OFF as the slave apparatus. Finally, the image forming apparatus C completes performing the job and becomes the energy saving standby mode SB as the main apparatus. As such, by dynamically changing the apparatus to function as the main apparatus, there is not a timing in which the operating mode and the energy saving standby mode simultaneously exist so that the electric power consumption of the entirety of the system can be reduced.

Similar to FIG. 6, FIG. 7 shows processes of the image forming apparatuses A to C of the embodiment. In FIG. 7, a case in which the image forming apparatus C functioning as the slave apparatus becomes the operating mode while the image forming apparatus A functioning as the main apparatus is at the energy saving standby mode SB. At a time (1), the image forming apparatus C starts to function as the main apparatus before performing the job as the image forming apparatus A currently functioning as the main apparatus is at the energy saving standby mode SB. Then, the image forming apparatus C sends the instruction to function as the slave apparatus to the image forming apparatus A. Upon receiving the instruction, the image forming apparatus A transitions to function as the slave apparatus and becomes the off mode OFF. As a result, the electric power consumption can be reduced compared with a case when the image forming apparatus A is kept being at the energy saving standby mode SB after the time (1).

Further, when the image forming apparatus C completes the job at a time (4), the instruction to function as the main apparatus is sent to the image forming apparatus A or B which is performing the job. The condition to determine the apparatus to which the instruction is sent may be, as described above, the timing when the apparatus transitions to the electric power saving mode, the charging state or the like.

Figure 8:
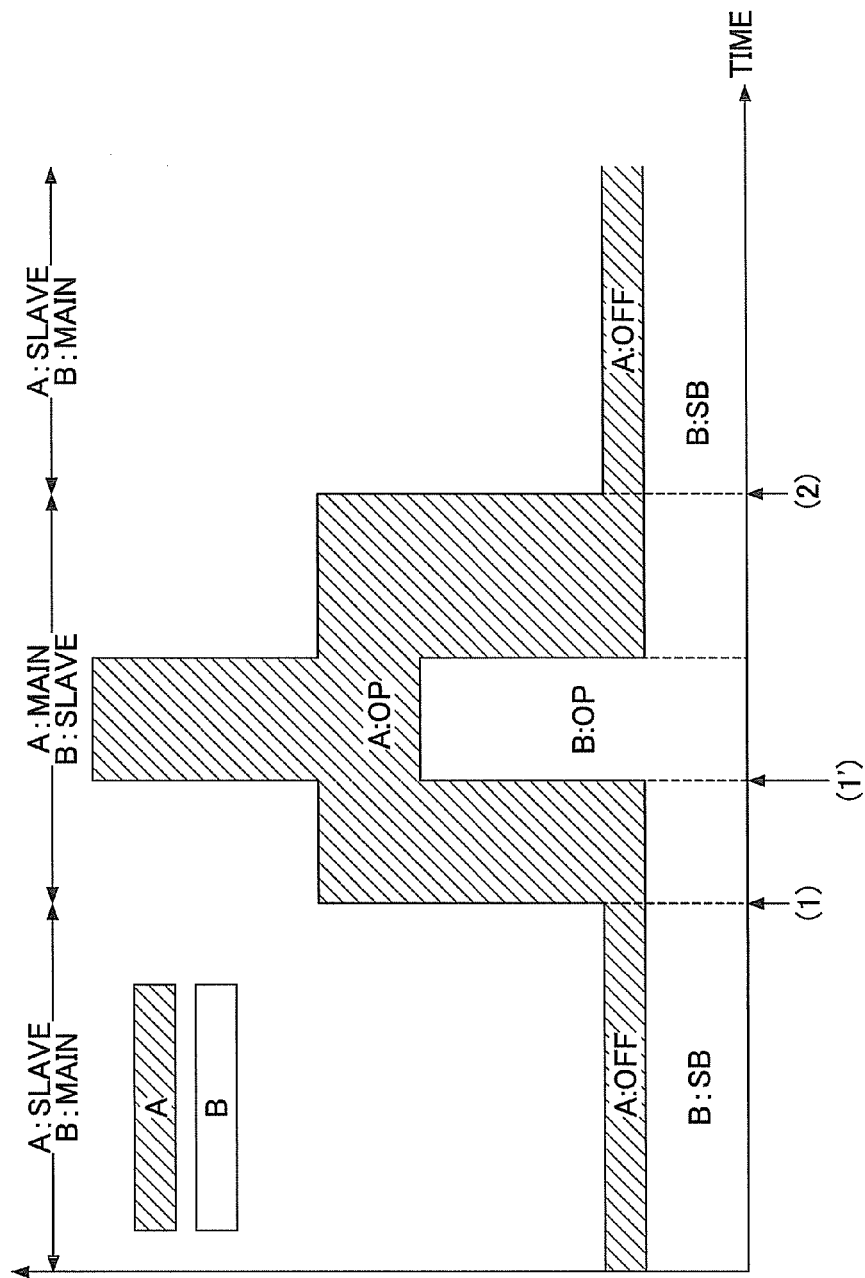
FIG. 8 is a view showing an example of switching functions of the image forming apparatuses of the embodiment.
Figure 9:
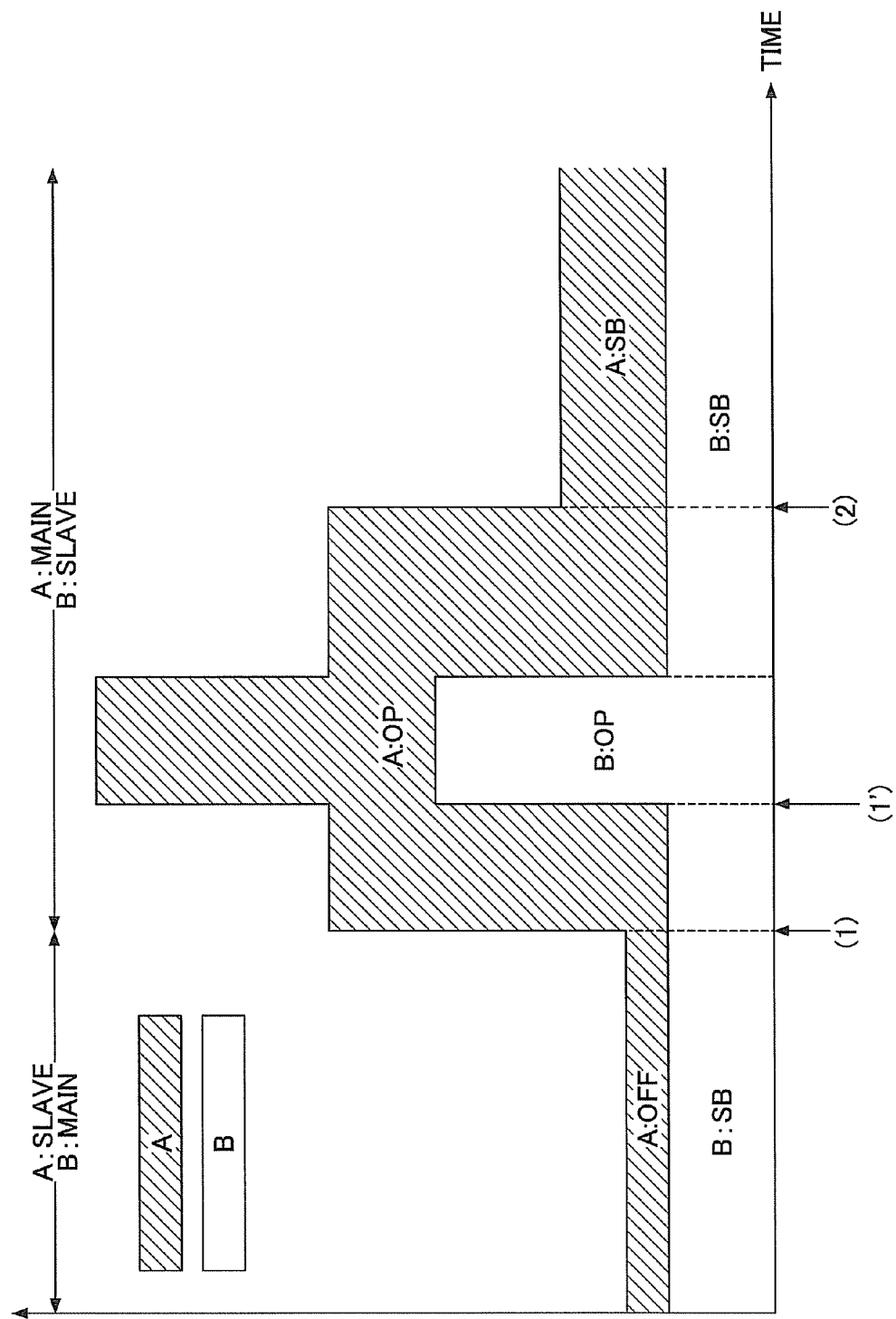
FIG. 9 is a view showing another example of switching functions of the image forming apparatuses.

Next, with reference to FIGS. 8 and 9, a case in which the system 1 includes an image forming apparatus A of the embodiment and another image forming apparatus B which is not capable of taking the off mode is explained. As the image forming apparatus B cannot be at the off mode, the image forming apparatus B mainly becomes the energy saving standby mode except when performing the job (operating mode).

At a time (1), the image forming apparatus A starts performing a job and transitions to the operating mode OP. Then, at a time (1'), the image forming apparatus B starts performing a job and transitions to the operating mode OP.

At a time (2), the image forming apparatus A which is functioning as the main apparatus completes performing a job and whether to transition to the slave apparatus is determined. The image forming apparatus A may be kept functioning as the main apparatus as shown in FIG. 9. However, as shown in FIG. 8, the image forming apparatus A may send an instruction to the image forming apparatus B to function as the main apparatus at the time (2) (step S422 of FIG. 4B) and become the slave apparatus. With this, the image forming apparatus A can transition to the off mode and the electric power consumption of the entirety of the system can be lowered.

Figure 10:
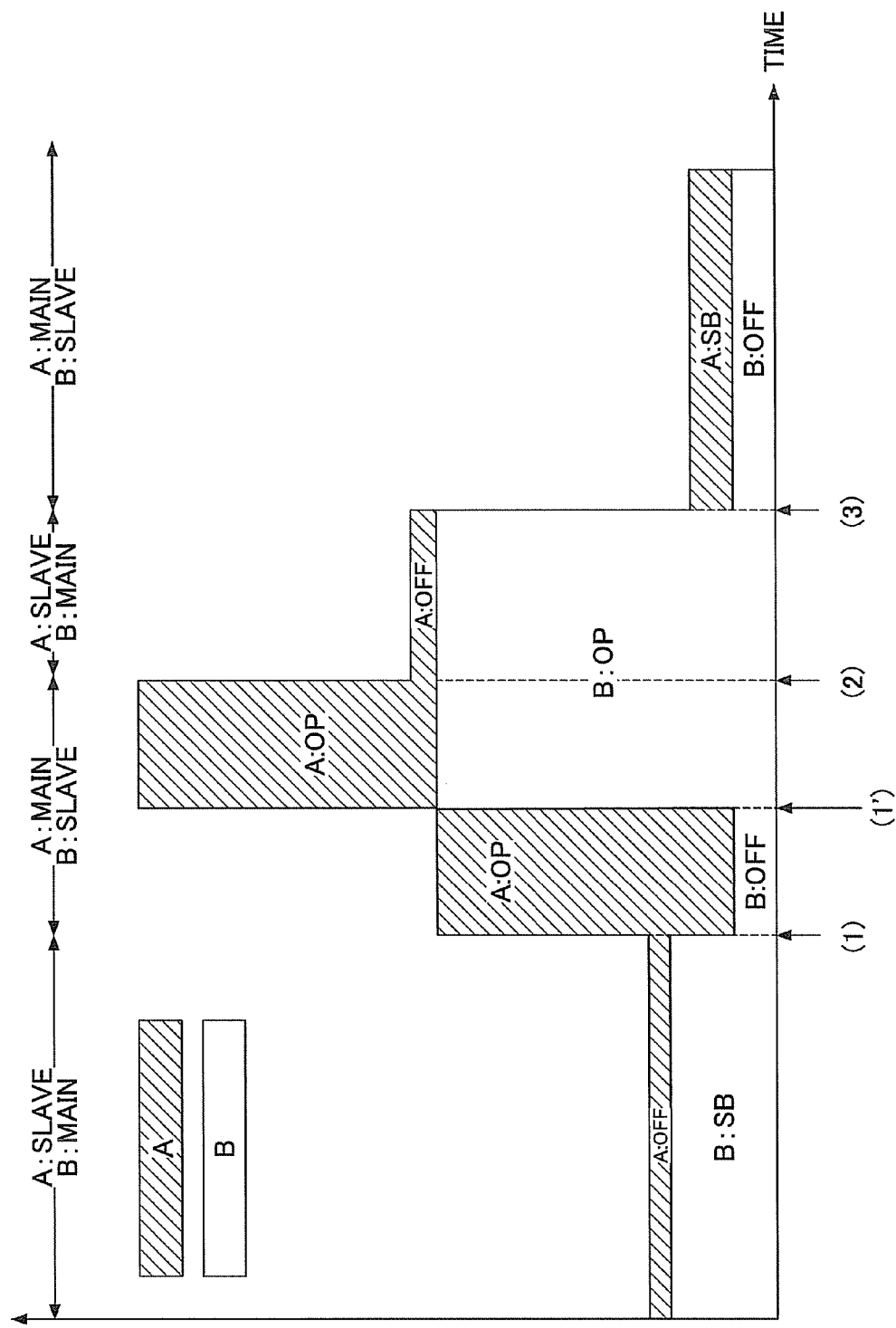
FIG. 10 is a view showing an example of switching functions of the image forming apparatuses of the embodiment.

FIG. 10 is a view showing an example of switching functions of two image forming apparatuses A and B of the embodiment whose electric power consumptions are different. For the example shown in FIG. 10, it is assumed that the total electric power consumption when the image forming apparatus A is at the off mode while the image forming apparatus B is at the energy saving standby mode is smaller than the total electric power consumption when the image forming apparatus A is at the energy saving standby mode while the image forming apparatus B is at the off mode.

At a time (1), the image forming apparatus A starts performing a job and transitions to the operating mode OP. Then, at a time (1'), the image forming apparatus B starts performing a job and transitions to the operating mode OP. Thereafter, the image forming apparatus A completes performing the job at a time (2), and the image forming apparatus B completes performing the job at a time (3).

Here, at the time (3) (step S422), one of the apparatuses is selected to function as the main apparatus. For this case, at the time (3), the image forming apparatus to function as the main apparatus is selected such that the electric power consumption of the entirety of the system becomes smaller. Here, the electric power consumption of each of the image forming apparatuses may be obtained based on previously prepared information (a table in which the typical electric power consumption is defined for each of the model number and the electric power saving mode, for example) by specifying the model name or the model number obtainable via the status information 324.

For the example shown in FIG. 10, the image forming apparatus A is selected to function as the main apparatus. Then, the image forming apparatus B sends the instruction to function as the main apparatus to the image forming apparatus A and becomes the slave apparatus. With this, even when the electric power consumptions of the plural image forming apparatuses are different, the electric power consumption of the entirety of the system can be reduced. Here, when the electric power consumption of the entirety of the system becomes small when the image forming apparatus B functions as the main apparatus, the functions of the image forming apparatuses A and B may not be changed at the time (3).

Although image forming apparatuses such as printer apparatuses are exemplified as the image processing apparatuses, the present invention is applicable to apparatuses capable of performing image processing other than image forming apparatuses.

According to the embodiment, the electric power consumption of the entirety of the system including the image forming apparatuses can be reduced.

The individual constituents of the image forming apparatus may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

Although a preferred embodiment of the image forming apparatus and the system including the plural image forming apparatuses has been specifically illustrated and described, it is to be understood that minor modifications may be made therein without departing from the spirit and scope of the invention as defined by the claims.

The present invention is not limited to the specifically disclosed embodiments, and variations and modifications may be made without departing from the scope of the present invention.

The present application is based on Japanese Priority Application No. 2012-059313 filed on Mar. 15, 2012, the entire contents of which are hereby incorporated by reference.

What is claimed is:

1. An image processing apparatus included in a system including another image processing apparatus, configured to transition, when not performing a job, to an electric power saving mode including
   a first electric power saving mode when functioning as a main apparatus in the system and
   a second electric power saving mode, whose electric power consumption is lower than that of the first electric power saving mode, when functioning as a slave apparatus, comprising:
   a status obtaining unit which obtains status information indicating the status of the other image processing apparatus;
   a function determining unit which determines whether the image processing apparatus is to function as the main apparatus or the slave apparatus based on the status of the other image processing apparatus which is obtained when the image processing apparatus is performing a job;
   a function control unit which controls the function of the image processing apparatus based on the determination by the function determining unit; and
   an instruction sending unit which sends an instruction to have the other image processing apparatus function as the slave apparatus when the image processing apparatus is determined to function as the main apparatus, and to have the other image processing apparatus function as the main apparatus when the image processing apparatus is determined to function as the slave apparatus to the other image processing apparatus;
   wherein the function determining unit determines that the image processing apparatus is to function as the slave apparatus when the other image processing apparatus is at an operating mode at a time when the image processing apparatus functioning as the main apparatus completes the job;
   wherein provided that the other image processing apparatus is configured to be unable to transition to the second electric power saving mode, the function determining unit determines that the image processing apparatus is to function as the slave apparatus even if the other image processing apparatus is not at an operating mode at a time when the image processing apparatus functioning as the main apparatus completes performing the job; and
   wherein the instruction sending unit sends the instruction to have the other image processing apparatus function as the main apparatus to the other image processing apparatus.

2. The image processing apparatus according to claim 1, wherein
   the function determining unit
      previously obtains a time at which the other image processing apparatus transitions to the electric power saving mode based on the status information and
      determines that the image processing apparatus is to function as the slave apparatus when a time at which the image processing apparatus functioning as the main apparatus completes performing the job is prior to the time at which the other image processing apparatus transitions to the electric power saving mode.

3. The image processing apparatus according to claim 1, wherein
   the function control unit controls the image processing apparatus to function as the slave apparatus when a response to the instruction is received from the other image processing apparatus after the instruction sending unit sends the instruction to have the other image processing apparatus function as the main apparatus to the other image processing apparatus.

4. The image processing apparatus according to claim 1, wherein
   the function determining unit determines that the image processing apparatus is to function as the main apparatus when the other image processing apparatus is at the electric power saving mode when the image processing apparatus functioning as the slave apparatus is to start performing the job, and
   the instruction sending unit sends the instruction to have the other image processing apparatus function as the slave apparatus to the other image processing apparatus.

5. The image processing apparatus according to claim 1, wherein
   the function determining unit determines that the image processing apparatus is to function as the main apparatus when an instruction for the image processing apparatus to function as the main apparatus is sent from the other image processing apparatus while the image processing apparatus functioning as the slave apparatus is performing the job, and
   the function control unit controls the image processing apparatus to function as the main apparatus.

6. The image processing apparatus according to claim 1, wherein when plural of the other image processing apparatuses are included in the system, the instruction sending unit selects one of the other image processing apparatuses to send the instruction to have the one of the other image processing apparatuses function as the main apparatus such that the total of the electric power consumption of the image processing apparatuses included in the system becomes the minimum when one of the other image processing apparatuses functions as the main apparatus, and sends the instruction to the selected one of the other image processing apparatuses.

7. A method of image processing performed in an image processing apparatus included in a system including another image processing apparatus, and configured to transition, when not performing a job, to an electric power saving mode including a first electric power saving mode when functioning as a main apparatus in the system and a second electric power saving mode, whose electric power consumption is lower than that of the first electric power saving mode, when functioning as a slave apparatus, the method comprising:

obtaining status information indicating the status of the other image processing apparatus;

determining whether the image processing apparatus is to function as the main apparatus or the slave apparatus based on the status of the other image processing apparatus which is obtained when the image processing apparatus is performing a job;

controlling the function of the image processing apparatus based on the determination;

sending an instruction to have the other image processing apparatus function as the slave apparatus when the image processing apparatus is determined to function as the main apparatus, and to have the other image processing apparatus function as the main apparatus when the image processing apparatus is determined to function as the slave apparatus to the other image processing apparatus;

determining that the image processing apparatus is to function as the slave apparatus when the other image processing apparatus is at an operating mode at a time when the image processing apparatus functioning as the main apparatus completes the job;

provided that the other image processing apparatus is configured to be unable to transition to the second electric power saving mode, determining that the image processing apparatus is to function as the slave apparatus even if the other image processing apparatus is not at an operating mode at a time when the image processing apparatus functioning as the main apparatus completes performing the job; and sending the instruction to have the other image processing apparatus function as the main apparatus to the other image processing apparatus.

8. A computer program product comprising a non-transitory computer-readable recording medium having recorded thereon a program that causes a computer to execute a method of image processing performed by an image processing apparatus included in a system including another image processing apparatus, and configured to transition, when not performing a job, to an electric power saving mode including a first electric power saving mode when functioning as a main apparatus in the system and a second electric power saving mode, whose electric power consumption is lower than that of the first electric power saving mode, when functioning as a slave apparatus, the method comprising:

obtaining status information indicating the status of the other image processing apparatus;

determining whether the image processing apparatus is to function as the main apparatus or the slave apparatus based on the status of the other image processing apparatus which is obtained when the image processing apparatus is performing a job;

controlling the function of the image processing apparatus based on the determination;

sending an instruction to have the other image processing apparatus function as the slave apparatus when the image processing apparatus is determined to function as the main apparatus, and to have the other image processing apparatus function as the main apparatus when the image processing apparatus is determined to function as the slave apparatus to the other image processing apparatus;

determining that the image processing apparatus is to function as the slave apparatus when the other image processing apparatus is at an operating mode at a time when the image processing apparatus functioning as the main apparatus completes the job;

provided that the other image processing apparatus is configured to be unable to transition to the second electric power saving mode, determining that the image processing apparatus is to function as the slave apparatus even if the other image processing apparatus is not at an operating mode at a time when the image processing apparatus functioning as the main apparatus completes performing the job; and sending the instruction to have the other image processing apparatus function as the main apparatus to the other image processing apparatus.

* * * * *